July 11, 1944.  W. H. LAMB  2,353,248
CLAMPING DEVICE
Filed July 10, 1942
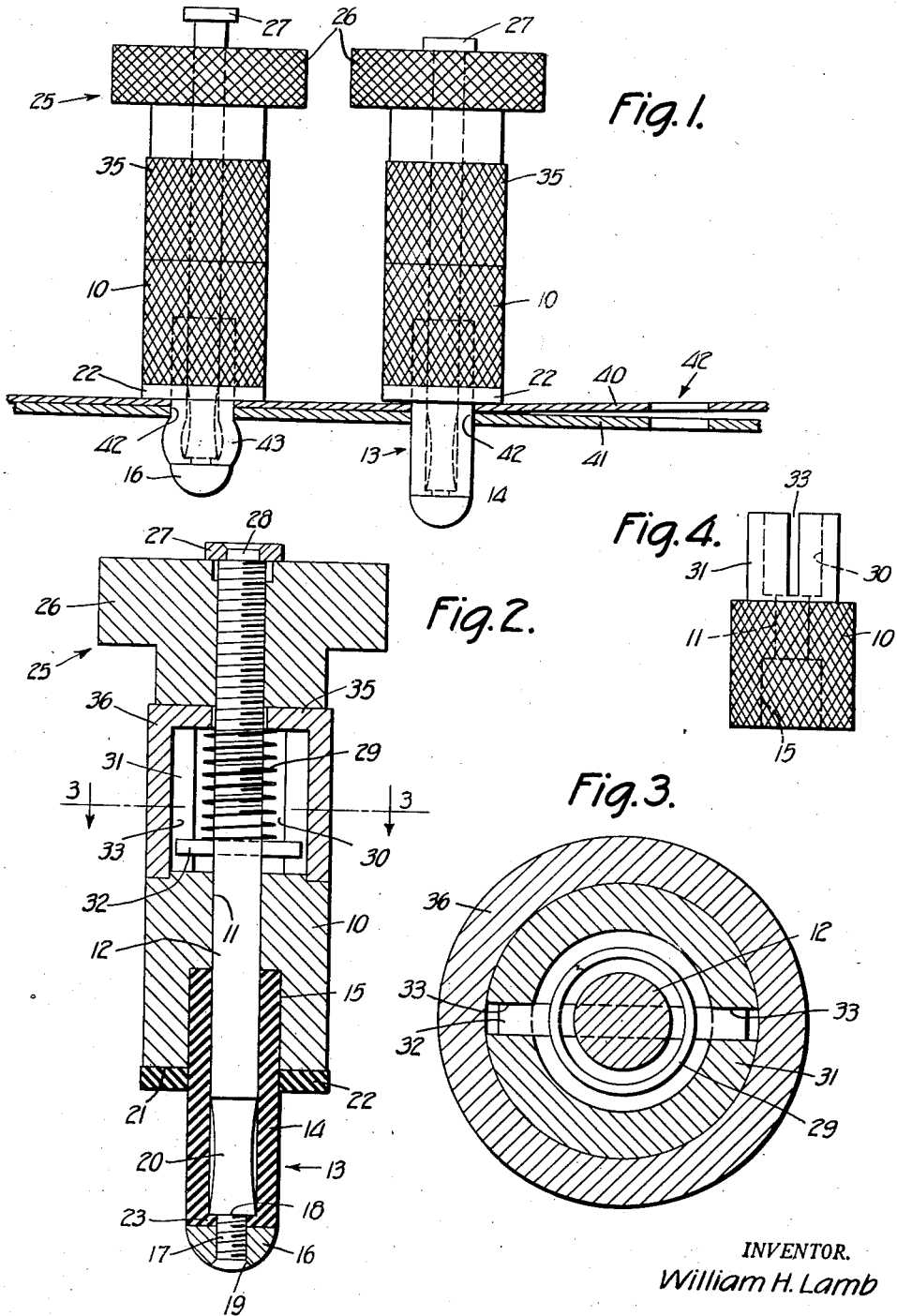
INVENTOR.
William H. Lamb
BY Moses & Nolte
ATTORNEYS Patented July 11, 1944

2,353,248

UNITED STATES PATENT OFFICE 2,353,248

CLAMPING DEVICE

William H. Lamb, Merrick, N. Y.

Application July 10, 1942, Serial No. 450,475

12 Claims. (Cl. 85—5)

This invention relates to improvements in clamping devices of the type which include an expansible member adapted for insertion through registering openings in two structural elements, one of which may be in sheet form, the device being arranged for operation from one side only of said elements so as to expand said member and clamp the elements together.

The invention is particularly applicable to the initial attachment of sheets of metal to structural supports or framework prior to riveting, and has been developed in connection with the mounting of the outer metal covering or skin on the frame of an aeroplane. In this operation, owing to the varying contour of the aeroplane surface, the metal sheets forming the skin may not lie snugly against the frame members when initially applied, and must be pressed into snug engagement therewith as well as clamped in place prior to riveting. This has heretofore been accomplished by the use of bolts; but there are numerous objections to the latter, including the time required for applying and removing the bolts as well as the necessity for employing the services of two workmen, one of whom must work from the inside of the frame, frequently in relatively inaccessible and restricted parts thereof.

A general object of the invention is to provide a clamping device that may be inserted through a rivet hole and operated from the outer side of the skin plate to clamp the plate firmly in place against the frame, the device being adapted for ready release and removal from the outside to permit the insertion of a rivet.

In this type of operation it is of greatest importance that the clamping device shall not mar or deform the skin plate adjacent the rivet hole, and in particular that the relatively thin margins of the hole shall not be deformed or the plate surface scratched or distorted, since even slight damage of this type may result in failure of the skin or rivet under the tremendous strains and vibrations to which they are subjected in modern aviation. An important feature of the invention is the provision of a clamping device of the indicated type that is adapted for rapid and convenient insertion, clamping and removal without marring in any way the rivet hole or adjacent portions of the plate.

The invention also comprises a clamping arrangement that is effective when the skin plate and frame member are spaced from each other, serving to draw them together.

A further feature is the provision of an improved expansible clamping head construction and operating mechanism therefor. In particular, an arrangement is provided for contracting the head to permit ready withdrawal and reuse of the clamping device. This is in general accomplished by providing an actuating member such as a rod extending through the rivet hole into the clamping head, which is expanded by outward movement of the rod and contracted by inward movement thereof, together with suitable mechanism, advantageously including a rotary member threaded on the rod, for shifting the latter. In the preferred embodiment illustrated herein the retaining head includes an expansible sleeve or tube which may be formed of rubber or other suitable material, the tube being of sufficient length to project beyond the rivet hole and permit expansion behind the frame.

The invention also includes an improved construction for mounting and operating the actuating rod. This advantageously includes means for preventing rotation of the rod, and means for biasing the rod inwardly, so that upon release of the clamping member the rod will be shifted inwardly to contract the retaining head and permit withdrawal thereof. In the preferred form the clamping device is provided with a body that is substantially free from projections or recesses, adapted to be readily grasped, applied to the work and operated.

Other objects and advantages of the invention will appear from the following description considered in connection with the accompanying drawing in which Fig. 1 is a side elevation view of two clamping devices embodying the invention, one in initially inserted position and the other in clamping position;

Fig. 2 is a longitudinal section through a clampnig device in inoperative position ready for insertion;

Fig. 3 is a transverse sectional view on line 3—3 of Fig. 2; and

Fig. 4 is a detail side elevation of the main body member.

In the illustrated embodiment the clamping device includes a cylindrical body member 10 provided with an axial bore 11 slidably fitting clamp rod 12. The clamping head 13 includes a laterally expansible element or unit surrounding rod 12, mounted on body member 10, projecting beyond the end of the latter and arranged for insertion through a rivet hole, the head 13 being expanded and contracted by longitudinal movement of rod 12 in bore 11.

In the embodiment illustrated the clamping head 13 includes a sleeve or tube 14 of expansible material. A short section of rubber tubing has been found suitable, though sleeve 14 may also be constructed of leather, woven or knitted cloth, woven wire of the type in which the wires are spirally arranged, or other suitable materials having the necessary characteristics. The tube 14 advantageously fits around rod 12 with one end of the tube seated in an annular recess 15 in body member 10 and the other end engaged by the outer end of clamp rod 12 at a sufficient distance from body member 10 to permit the tube 14 to project beyond the inner face of the members to be clamped together, as shown in Fig. 1.

The projecting or inner end of tube 14 may be clamped to rod 12, an arrangement that is particularly desirable when the material of the tube does not possess the longitudinal resilience necessary to force the rod 12 into inoperative position when released by the actuating mechanism. Such an arrangement may be necessary, for instance, where a cloth tube is employed. It is shown in detail in Fig. 2, and includes a metal tip 16 threaded on the reduced end 17 of rod 12 and clamping the adjacent margin of tube 14 against shoulder 18 formed on said rod. Tip 16 may be suitably fixed in place as by peening the outer face of rod end 17 at its outer margin 19.

Tube 14 may be arranged with an inturned flange 23 extending between tip 16 and shoulder 18, the flange being formed in suitable manner as by bending, molding or the like. However, when tube 14 is constructed from rubber or other material having sufficient lengthwise resilience to contract into tubular form after the endwise pressure on the tube by tip 16 has been released, it is unnecessary to provide an engagement between the tube and rod 12, and shoulder 18 may be omitted. Specifically, tube 14 may be formed of a section of ordinary rubber tubing with its outer end bearing against tip 16.

Tip 16 is advantageously the same in diameter as the outer face of tube 14 and its exposed face is suitably tapered to facilitate introduction into the rivet hole, said face being hemispherical in the illustrated embodiment. The portion 20 of clamp rod 12 underlying the part of tube 14 which projects beyond body member 10 may be slightly concave, it having been found that this construction facilitates the bulging of tube 14 when rod 12 is drawn outwardly through body member 10, compressing the tube.

The outside diameter of tube 14 and tip 16 is slightly less than that of the rivet hole, facilitating insertion of head 13 through the hole without marring the plate edge. The inner face 21 of body member 10 is arranged to bear uniformly against the outer face of the skin plate around the rivet hole, and is advantageously covered by a suitable washer 22, which may be of rubber or other suitable material which will not mar or distort the plate, the washer fitting around tube 14.

A suitable construction is carried by body member 10 for shifting clamping rod 12 lengthwise, and advantageously comprises a rotary member threaded on the rod. In the form illustrated a cylindrical nut 25 having a radially projecting knurled head 26 is threaded on the outer end portion of rod 12, and bears against the outer face of body member 10. A suitable retaining member for preventing accidental removal of nut 25 is advantageously provided, such as retaining disk 27 suitably held in place on rod 12 as by peening the outer end of a reduced extension 28 of rod 12 passing through disk 27.

A suitable construction is provided for forcing rod 12 inwardly through body member 10 when the operating nut 25 is backed off. It is likewise necessary to provide means for preventing rod 12 from rotating with nut 25. In the construction illustrated this is accomplished by a coil spring 29 located around rod 12 in an annular recess 30 formed in the outer section 31 of body member 10. A pin 32 extending transversely through rod 12 projects into vertical slots 33 in body section 31 and is engaged by the inner end of spring 29. The outer end of said spring presses outwardly against a suitable element carried by body member 10.

A suitable abutment carried by the body and engaging the outer end of spring 29 is provided. This conveniently includes an annular flat spring-retaining member 35 surrounding rod 12 and extending across the upper end of recess 30, the operating nut 25 bearing against the outer face of member 35. The latter member is suitably attached to the body member 10. In the form shown the retaining member 35 is formed integral with a cylindrical wall 36 having a force fit over the outer section 31 of the body member 10, the outer face of wall 36 being advantageously flush with the lower portion of said body member to provide a uniform generally rounded body suitable for grasping by one hand of the user, the outer surface of the lower portion of body member 10 and wall 36 being advantageously knurled to facilitate gripping. It will be understood that while a cylindrical contour for body member 10 and wall 36 is disclosed, this may be modified to provide any desired shape of gripping surface adapted to be engaged either manually or by suitable tools and the like.

The operation of the clamping device is indicated in Fig. 1 in connection with clamping an aeroplane skin plate 40 to the web of a frame member 41. A series of registering rivet holes 42 have been formed in plate 40 and member 41, being arranged in rows extending along the frame member in the usual manner. When the clamping device is ready for use as shown at the right of Fig. 1 and in Fig. 2, the operating nut 25 has been backed off until it is stopped by disk 27, and clamp rod 12 is in innermost position with the tube 14 contracted into normal cylindrical form. The clamping head 13 is thrust through registering rivet holes 42 until washer 22 bears against plate 40; and if necessary a certain amount of manual pressure may be used to bring said plate reasonably close to frame member 41. Operating nut 25 is then rotated, the body 10 and housing member 35 being advantageously grasped with the other end, their outer surfaces being knurled or otherwise roughened to facilitate a good grip. As rod 12 is thereby drawn outwardly by nut 25 the axial pressure of tip 16 on the end of tube 14 at a point substantially beyond the inner face of frame member 41 will force the tube to bulge outwardly between said frame member and tip. Since the operation involves substantial circumferential expansion of the bulged portion it will be progressively resisted as the tube material stretches, and a rapidly increasing proportion of the thrust of tip 16 will be exerted axially against the face of the clamping head bulge 43 (Fig. 1) which bears against member 41. This pressure will tend to draw the washer 22 and the clamping head bulge 43 together, forcing plate 40 against member 41; and operating nut 25 is rotated until the requisite clamping pressure is developed. It will be noted that the pressure against the marginal portions of the plate 40 adjacent rivet hole 42 is exerted solely by yielding elements and under conditions which prevent any tendency toward damage or distortion. When the necessary pressure has been produced the device may be released and is self-locking, the entire operation of insertion and tightening requiring only a very short time.

Another clamping member is then advantageously inserted in the adjacent rivet hole 42, since any spread between the plate 40 and frame member 41 at the latter hole will be well within the capacity of the clamping device for drawing the plate and member together. By thus clamping the plate at successive rivet holes in a long series the plate may be rapidly and smoothly drawn against the frame member, even though one end of the plate may be widely spaced from said member when the other end is initially held in place by a clamping member. After the plate has been positioned and clamped by a sufficient number of clamping devices, the latter can be removed as desired for riveting simply by backing off each operating nut 25.

It will be apparent that devices embodying the invention are capable of very simple and strong construction and are extremely rapid and simple in operation, both in clamping the plates in place and in removing the clamp for riveting. They may be used a great many times without damage; and the only parts subject to serious wear or damage, the tube 14 and washer 22, are arranged for ready replacement. While an assembly to be riveted is disclosed, this is not intended as a limitation, though the invention is especially advantageous for such use.

I have described what I believe to be the best embodiments of my invention. I do not wish, however, to be confined to the embodiments shown, but what I desire to cover by Letters Patent is set forth in the appended claims.

I claim:

1. A clamping device comprising a body member having a clamping face at one end, an expansible and contractible clamping member projecting from said face, and mechanism for expanding and contracting said member including a rod slidably mounted in the body member, a coil spring surrounding the rod located in a recess at an end of the body member, a spring-engaging pin extending transversely through the rod and across the recess, a vertical guideway in the body member slidably engaged by the pin, a spring-retaining member having an outer wall engaging the outer wall of the body member, said wall overlying the guideway and being provided with an inwardly extending projection engaging an end of the spring, and an actuating nut threaded on the rod and bearing against said projection.

2. A device for temporarily clamping two plates together comprising a body having a clamping face for engaging one of said plates, a clamping member including an expansible and contractible tube projecting from said face and adapted to be inserted through registered holes in said plates, and mechanism for expanding and contracting said tube including a rod slidably mounted in the body, extending through said tube and engaging the tube at a point spaced from said face, the arrangement being such that movement of the rod in one axial direction will compress and bulge the tube convexly outwardly into pressing engagement with the other plate, and movement thereof in the other direction will release the compression to facilitate return of the tube to normal contour.

3. A clamping device as set forth in claim 2 in which one end of the tube is seated in an annular recess in the body surrounding the rod.

4. A clamping device as set forth in claim 2 in which an end of the rod engages an end portion of the tube.

5. A clamping device as set forth in claim 2 including a tube compressing member mounted on the end of the rod and extending laterally across the adjacent end of the tube.

6. A clamping device as set forth in claim 2 in which the tube is attached to the rod at a point spaced from said face.

7. A clamping device as set forth in claim 2 in which the tube is constructed principally of rubber.

8. A device for temporarily clamping two plates together comprising a body having a clamping face for engaging one of said plates, a clamping member projecting from said body and adapted to be inserted through registered holes in said plates, said clamping member having a sleeve of resilient material, a mechanism for bulging said sleeve from contracted condition convexly outwardly into clamping engagement with the other plate to urge said plates together, and including a rod extending through said body, and anchored to said sleeve for movement therewith, and a rotatable member threaded on said rod and bearing against the body, said sleeve being normally urged by its inherent resiliency towards contracted condition.

9. A device for temporarily clamping two plates together comprising a body having a clamping face for engaging one of said plates, a clamping member projecting from said body and adapted to be inserted through registered holes in said plates, said clamping member having a sleeve of resilient material, a mechanism for bulging said sleeve from contracted condition convexly outwardly into clamping engagement with the other plate to urge said plates together, and including a movable member connected to the outer end of said sleeve, a rotatable member for moving said movable member in one direction to bulge said sleeve, and spring means urging said movable member in the opposite direction.

10. A device for temporarily clamping two plates together comprising a body having a face adapted to engage one of said plates in clamping position, a cylindrical tube of resilient material free from surrounding restrictions having one end section extending into and affixed to said body and having a portion projecting from said body beyond said face, and adapted to extend through registered holes in said plates, a rod slidably extending through said tube and said body and anchored at one end to the outer end of said tube, and means for sliding said rod axially, whereby upon axial movement of said rod in one direction the tube is bulged convexly outwardly in pressing engagement with the other plate, and upon movement of the rod in the opposite direction, said tube is restored to normal cylindrical condition.

11. A device for temporarily clamping two plates together comprising a body of rigid material, a facing of softer yieldable material at one end of said body adapted to engage one of said plates in clamping position, a cylindrical tube of resilient material free from surrounding restrictions and extending from said facing, said tube being adapted to extend through registered holes in said plates, a rod slidably extending through said tube and said body and anchored at one end to the outer end of said tube, and means for sliding said rod axially, whereby upon axial movement of said rod in one direction, the tube is bulged convexly outwardly in pressing engagement with the other plate, and upon movement of the rod in the opposite direction, said tube is restored to normal cylindrical condition.

12. A clamping device including a body, a plate clamping sleeve of flexible material extending from one end of said body and having an inturned flange, a rod slidably extending in said sleeve and said body and having a reduced end passing through said flange, said rod presenting a shoulder seated on the inner face of said flange, a tip secured to said reduced rod end and engaging the outer face of said flange, and means for moving said rod axially in said body to bulge said sleeve convexly outwardly.

WILLIAM H. LAMB.